US006952766B2

(12) United States Patent
Dervin et al.

(10) Patent No.: US 6,952,766 B2
(45) Date of Patent: Oct. 4, 2005

(54) AUTOMATED NODE RESTART IN CLUSTERED COMPUTER SYSTEM

(75) Inventors: Jennifer Anne Dervin, Rochester, MN (US); Robert Miller, Rochester, MN (US); Vicki Lynn Morey, Pine Island, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/809,408

(22) Filed: Mar. 15, 2001

(65) Prior Publication Data

US 2002/0133727 A1 Sep. 19, 2002

(51) Int. Cl.$^7$ ..................... G06F 15/177; G06F 15/173; G06F 11/00
(52) U.S. Cl. .......................... 713/2; 709/222; 709/223; 714/4; 714/48
(58) Field of Search ........................... 713/2, 200, 300; 709/223, 220; 714/38, 4, 47, 48, 43

(56) References Cited

U.S. PATENT DOCUMENTS

| 5,347,524 | A |   | 9/1994  | I'Anson et al.        |
|-----------|---|---|---------|-----------------------|
| 5,590,277 | A | * | 12/1996 | Fuchs et al. .... 714/38 |
| 5,704,031 | A |   | 12/1997 | Mikami et al.         |
| 5,748,882 | A | * | 5/1998  | Huang ............ 714/47 |
| 5,748,883 | A |   | 5/1998  | Carlson et al.        |
| 5,805,785 | A | * | 9/1998  | Dias et al. ......... 714/4 |
| 5,828,836 | A | * | 10/1998 | Westwick et al. .... 709/200 |

(Continued)

OTHER PUBLICATIONS

U.S. Appl. No. 09/281,026, entitled "Cluster Node Distress Signal," filed on Mar. 30, 1999 by Block et al.

U.S. Appl. No. 09/481,177, entitled "Delivery of Configuration Changes in a Group Communication System," filed on Jan. 12, 2000 by Funk et al.
U.S. Appl. No. 09/638,328, entitled "Merge Protocol for Clustered Computer System," filed on Aug. 14, 2000 by Miller et al.
U.S. Appl. No. 09/827,804, entitled "Node Shutdown in Clustered Computer System," filed on Apr. 6, 2001 by Block et al.
U.S. Appl. No. 09/920,470, entitled "Forwarding of Diagnostic Messages in a Group" filed on Aug. 1, 2000 by Miller et al.
U.S. Appl. No. 09/697,398, entitled "Group Data Sharing During Membership Change in Clustered Computer System," filed on Oct. 27, 2000 by Miller et al.
U.S. Appl. No. 09/718,924, entitled "Apparatus and Method for Communicating Between Computer Systems Using a Sliding Send Window for Ordered Messages in a Clustered Computing Environment," filed on Nov. 22, 2000 by Timothy R. Block.
U.S. Appl. No. 09/827,804, entitled "Node Shutdown in Clustered Computer System," filed on Apr. 6, 2001 by Timothy Roy Block et al.

*Primary Examiner*—Chun Cao
(74) *Attorney, Agent, or Firm*—Wood, Herron & Evans, LLP

(57) ABSTRACT

An apparatus, program product and method initiate a restart of a node in a clustered computer system using a member of a clustering group that resides on a different node from that to be restarted. Typically, a restart operation is initiated by the member in response to a membership change message sent by another group member that is resident on the node to be restarted, with an indicator associated with the membership change message that indicates that a restart should be initiated. Typically, the restart is implemented in much the same manner as a start operation that is performed when a node is initially added to a cluster, with additional functionality utilized to preclude repeated restart attempts upon a failure of a prior restart operation.

35 Claims, 3 Drawing Sheets

U.S. PATENT DOCUMENTS

| | | | |
|---|---|---|---|
| 5,856,981 A | * 1/1999 | Voelker | 714/712 |
| 5,991,518 A | 11/1999 | Jardine et al. | |
| 6,108,699 A | 8/2000 | Moiin | |
| 6,115,393 A | 9/2000 | Engel et al. | |
| 6,125,390 A | * 9/2000 | Touboul | 709/223 |
| 6,151,688 A | * 11/2000 | Wipfel et al. | 714/48 |
| 6,192,483 B1 | * 2/2001 | Moiin et al. | 714/4 |
| 6,243,814 B1 | * 6/2001 | Matena | 713/200 |
| 6,314,526 B1 | 11/2001 | Arendt et al. | |
| 6,393,485 B1 | * 5/2002 | Chao et al. | 709/231 |
| 6,438,705 B1 | 8/2002 | Chao et al. | |
| 6,442,713 B1 | 8/2002 | Block et al. | |
| 6,449,641 B1 | * 9/2002 | Moiin et al. | 709/220 |
| 6,460,149 B1 | 10/2002 | Rowlands et al. | |
| 6,493,715 B1 | * 12/2002 | Funk et al. | 707/10 |
| 6,526,521 B1 | * 2/2003 | Lim | 714/4 |
| 6,662,219 B1 | * 12/2003 | Nishanov et al. | 709/220 |
| 6,718,486 B1 | * 4/2004 | Roselli et al. | 714/41 |
| 6,721,274 B2 | 4/2004 | Hale et al. | |
| 6,763,023 B1 | 7/2004 | Gleeson et al. | |
| 2002/0075841 A1 | 6/2002 | Steer et al. | |
| 2003/0159084 A1 | 8/2003 | Murphy et al. | |
| 2004/0083299 A1 | 4/2004 | Dietz et al. | |

\* cited by examiner

AUTOMATED NODE RESTART IN CLUSTERED COMPUTER SYSTEM

FIELD OF THE INVENTION

The invention is generally directed to clustered computer systems, and in particular, to the handling of node restart operations thereon.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group. One example of a protocol utilized by many clusters is a membership change protocol, which permits member jobs to be added to or removed from a group. Another example of a protocol is a node start protocol, which enables new nodes to be added to a cluster.

Clustered computer systems place a high premium on maximizing system availability. As such, automated error detection and recovery are extremely desirable attributes in such systems. One potential source of errors is that of a node failure, which ultimately requires that a node be expelled from a cluster before the node can resume clustering. For example, in many clustered computer systems, individual nodes rely on an underlying clustering infrastructure, often referred to as clustering resource services. Due to various error conditions, such as the failure of a cluster-critical job, or a failure within the clustering infrastructure, the infrastructure may need to be re-initialized to permit the node to reregister with the other nodes in a cluster.

In most instances, it would be extremely desirable to automatically recover from a node failure and reconnect the node to the cluster. In some instances, a node may lose communication with other nodes in a cluster, whereby extraordinary measures may be required to reconnect a node to a cluster. However, in other instances, a failure on a node (e.g., a failure in a cluster-critical job) may not immediately affect communications of that node with other nodes in a cluster. In these latter types of failures, a node may lose cluster registration, and appear to other nodes in the cluster that the node is dead. Nonetheless, the node may be functional and alive, but incapable of participating in a cluster. In such instances, it is often desirable to "restart" the node to reintroduce the node to the cluster and re-establish clustering on the node.

As an example, a cluster-wide monitoring job may be used in the various nodes in a cluster to monitor the activities of other member jobs executing on the cluster. If such a monitoring job fails on a node, the node must end, since there is nothing doing the monitoring on that node. Restarting just the monitor may not be sufficient because, while the monitor was down, other jobs the monitor was supposed to monitor may have also gone down. It would also be complicated for a restarted monitor to ascertain what may have happened while the monitor was down.

Conventionally, resolution of the failure of a cluster-critical job requires that the node leave the cluster, and then be restarted to add the node back into the cluster in much the same manner as a node is initially added to a cluster. Typically, the restart of a node is initiated via a manual operation by an administrator or operator, or via an automated script executing on the node. A manual operation necessarily requires human intervention, and thus is prone to human error, as well as reduced system availability while an administrator manually restarts the node.

An automated script running on a failed node is also problematic, since a failed node may be incapable of re-joining a cluster after the node has failed. In particular, a failing node may not be capable of determining what caused its failure. Moreover, if the reason for failure is the loss of clustering information required to join with a cluster (e.g., cluster membership data), the node may not be capable of determining how the node joins with an existing cluster. Furthermore, if the failure that required the node to be restarted was incapable of being remedied through a simple restart procedure, a potential exists that an automated script would lock-up while attempting to continually restart the node without success.

Therefore, a significant need exists in the art for a manner of automating the process of detecting and initiating the restart of a node in a clustered computer system, in particular, to increase system availability and reduce operator intervention.

SUMMARY OF THE INVENTION

The invention addresses these and other problems associated with the prior art in providing an apparatus, program product and method that initiate a restart of a node in a clustered computer system using a member of a cluster group that resides on a different node from that to be restarted.

In various embodiments consistent with the invention, a restart operation may be initiated by the member on the different node in response to a membership change message sent by another group member that is resident on the node to be restarted, with an indicator associated with the membership change message that indicates that a restart should be initiated. Moreover in some embodiments, a restart may be implemented in much the same manner as a start operation that is performed when a node is initially added to a cluster. Additional functionality, however, is typically utilized to preclude repeated restart attempts upon a failure of a restart operation.

By initiating a restart from a node other than a failing node, efficient and reliable node restart operations are typically capable of being performed without operator intervention. Moreover, such operations can typically be initiated even if the failing node has lost any information that would otherwise be required to initiate a restart from that node directly. As such, a clustered computer system incorporating such functionality typically has greater reliability and adaptability, and thus improved system performance over conventional systems.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize the cluster in which a failed node participates, and in particular a node other than the failed node, to initiate an automated restart of the failed node. In particular, the embodiments described hereinafter rely on a notification from a group member residing on a failed node to induce another group member that resides on a node different from the failing node to initiate a restart operation on the failed node. The principles of the invention may apply to various clustering environments, where multiple nodes collectively perform tasks, and typically present a single system image to external devices and users. A wide variety of clustering environments and clustering infrastructures may be utilized in connection with the invention.

Figure 1:
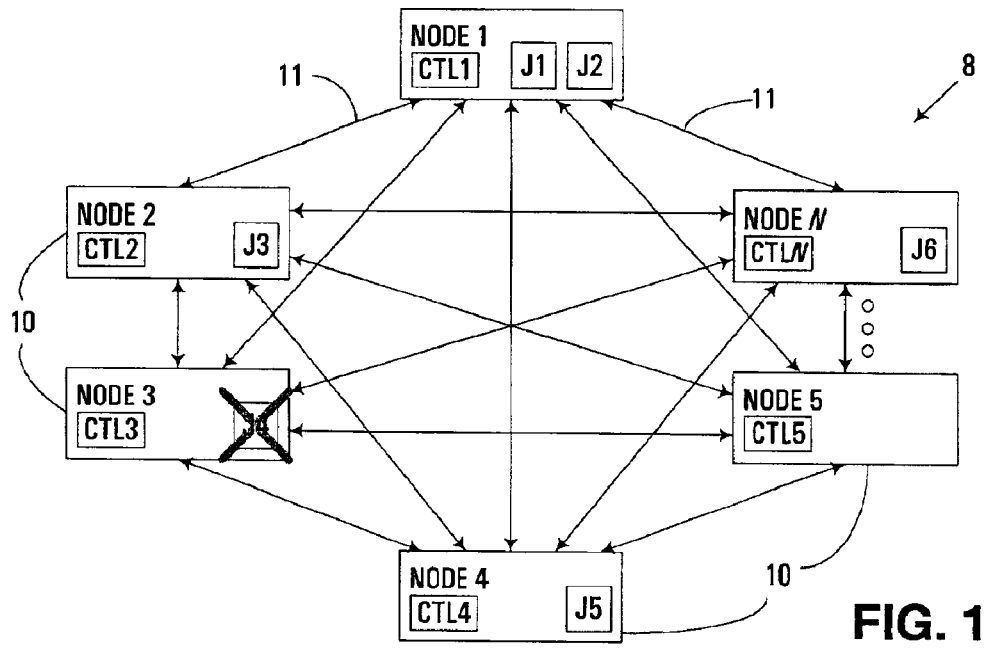
FIG. 1 is a block diagram of a clustered computer system consistent with the invention, illustrating an exemplary clustering failure and automated node restart operation on the clustered computer system.

As shown in FIG. 1, for example, a clustered computer system 8 may include a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N. Resident within various nodes are a plurality of jobs J1–J6 forming the members of an exemplary group in the clustered computer system. As shown in this figure, nodes in a clustered computer system are not required to participate in all groups (e.g., node 5). Moreover, multiple jobs from a given group may be resident in the same node (e.g., jobs J1 and J2 in node 1).

Also illustrated in FIG. 1 is an exemplary cluster control group, including a group member, referred to herein as a cluster control (CTL) job, resident on every node participating in the cluster (e.g., jobs CTL1–CTLN, resident respectively on nodes 1–N). Most if not all conventional clustering environments incorporate functionality analogous to a cluster control group, which typically manages various cluster functions such as starting and ending nodes, adding or removing nodes to or from a cluster, etc., and which typically requires that a member job be resident on each node participating in a cluster. Moreover, it is anticipated that each node participating in a cluster will incorporate lower-level functionality, referred to herein as either the clustering infrastructure or clustering resource services, which handles basic clustering functionality, e.g., inter-node communications, message ordering, heartbeat monitoring, etc.

It is anticipated that the cluster control group (or another analogous group) will typically implement much of the automated restart functionality described herein, e.g., through the initiation of messages that are communicated between nodes by the clustering resource services of the various nodes in a cluster. However, it should be appreciated by one of ordinary skill in the art having the benefit of the instant disclosure that the invention does not require implementation of automated restart functionality within a cluster control group, and with the assistance of the clustering infrastructure, in all instances. Therefore, the invention is not limited to the particular clustering environment disclosed herein.

As an example of a node failure, assume that the exemplary group comprising jobs J1–J6 is a cluster-critical group, whereby a member of such group must be active and resident on a node for that node to participate in a cluster. Assume for the purposes of the example that cluster-critical job J4 fails on node 3 of FIG. 1. Consistent with the invention, a failure in job J4 will result in a clustering failure on node 3. In this context, the clustering failure refers to the type of node failure where a node loses cluster registration and appears to be dead from the perspective of the other nodes in the cluster. Nonetheless, a clustering failure of the type described herein includes a type of failure where the clustering infrastructure on a failing node is still capable of sending messages to the cluster, at least long enough to notify the other nodes in the cluster of a need to restart the node. It will be appreciated that in instances where the clustering infrastructure has a fatal error, and no messages may be sent to other nodes of the cluster, alternative functionality would typically be required to initiate a node restart.

In the illustrated embodiments, the types of errors that may initiate a clustering failure capable of initiating an automated node restart include errors such as the failure of cluster-critical jobs such as monitor jobs, storage access jobs, name server jobs, etc. In some embodiments, a cluster-critical job may also incorporate a cluster control job that participates in a cluster control group as described herein. Other relevant errors may include errors related to the corruption of vital clustering data required by a node, e.g., group or member lists, and other information that a node may require to participate in clustering.

In the illustrated embodiments, various entities within a node may locally detect a clustering failure on the node. For example, a failure may be detected by any member job resident on that node, including, for example, a cluster control job. Detection of errors may also be performed by the clustering infrastructure. Other logical entities capable of detecting errors in a computer system may also be used in the alternative.

To address a detected node failure, embodiments consistent with the invention notify the cluster, and in particular, a group member resident on another node in the cluster, of the failure of the node, with the notified member initiating the restart of the failed node. Typically, the notification relies on the existing ordered messaging system in the cluster. Moreover, as will become more apparent below, the initiated restart operation typically operates in much the same manner as a conventional start operation that is used whenever a new node is being added to a cluster. Furthermore, functionality is incorporated to detect recursive restart attempts, e.g., as may occur if a node failure occurs during a restart operation. The additional functionality therefore prevents repeated, recursive attempts to restart a node, when restart via the mechanism described herein is not possible.

Given that clustered computer systems typically permit inter-node communication predominantly between members of the same group, it is anticipated that in most embodiments, the notification of an error in a failing node, and the initiation of a restart operation, will be performed by different members within the same group. In the illustrated embodiments, for example, such operations are performed by the cluster control members on the failing and another node in the cluster. Other entities, however, may perform such functionality in other embodiments consistent with the invention.

It will be appreciated that nomenclature other than that specifically used herein to describe the handling of computer tasks by a clustered computer system may be used in other environments. Therefore, the invention should not be limited to the particular nomenclature used herein, e.g., as to protocols, requests, messages, jobs, groups, etc.

Figure 2:
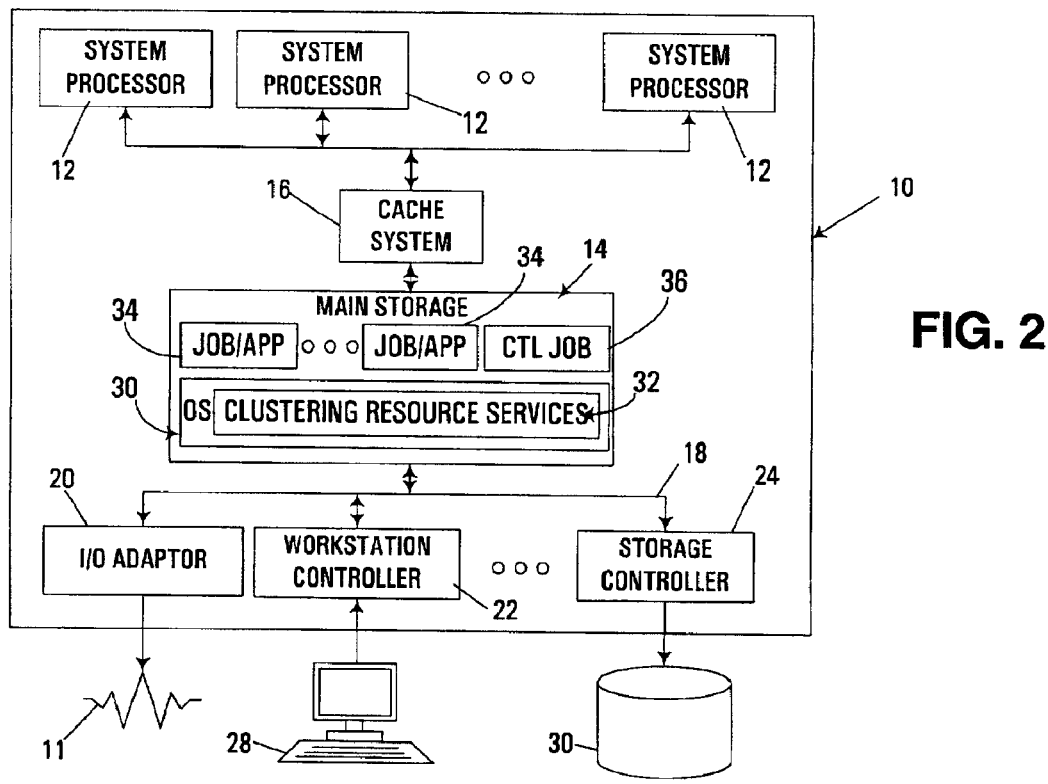
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

To implement automated node restart functionality consistent with the invention, each node in a cluster typically includes a clustering infrastructure to manage the clustering-related operations on the node. For example, node 10 is illustrated as having resident in main storage 14 an operating system 30 implementing a cluster infrastructure referred to as clustering resource services 32. One or more jobs or applications 34 are also illustrated, each having access to the clustering functionality implemented within clustering resource services 32. Moreover, node 10 typically includes a cluster control (CTL) job 36 that participates in a cluster control group to assist in managing clustering functionality on behalf of the node. It will be appreciated, however, that the functionality described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to implement the above-described automated node restart functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
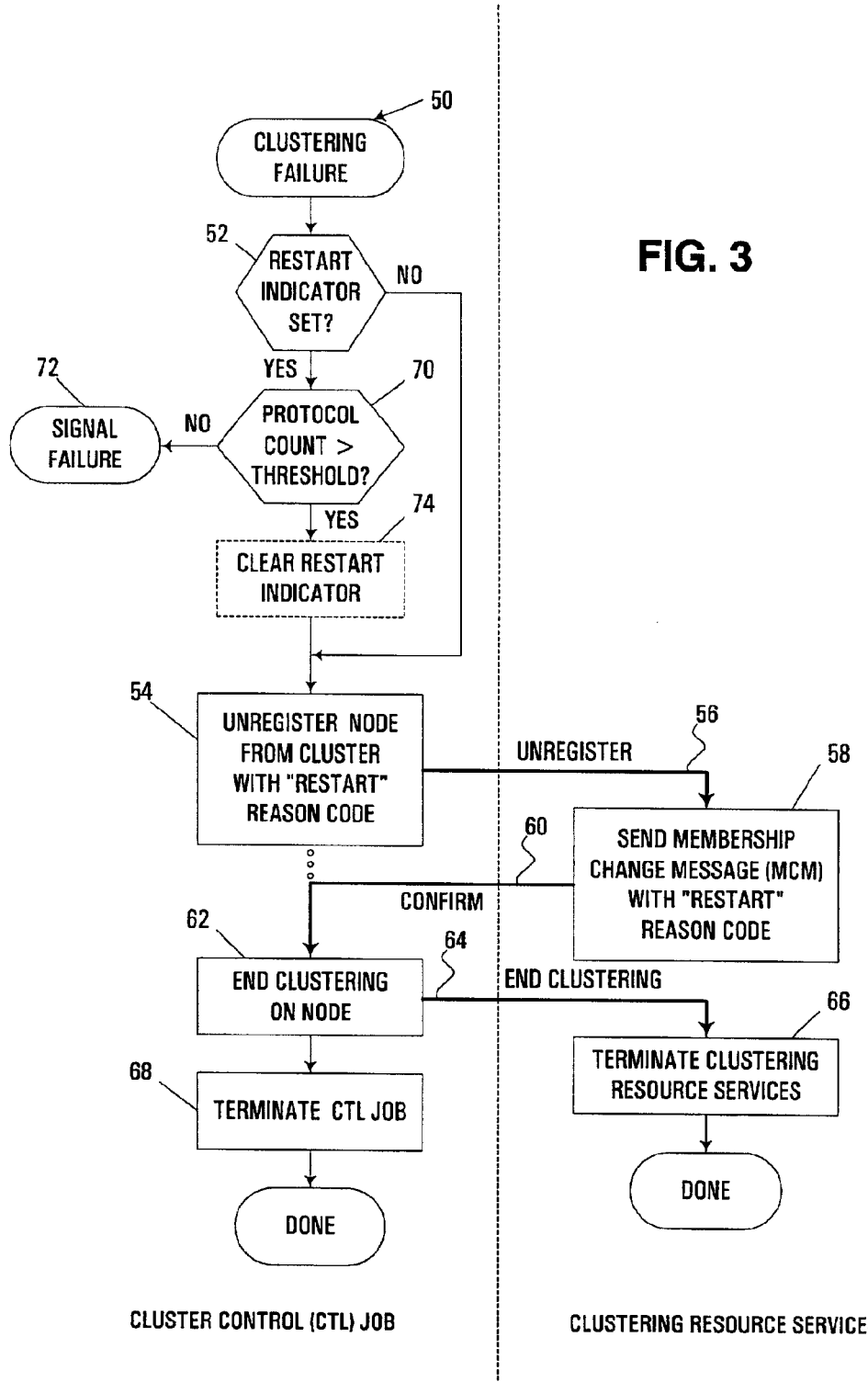
FIG. 3 is a flowchart illustrating the program flow of a clustering failure operation initiated by a cluster control job on a failing node in the clustered computer system of FIG. 1.
Figure 4:
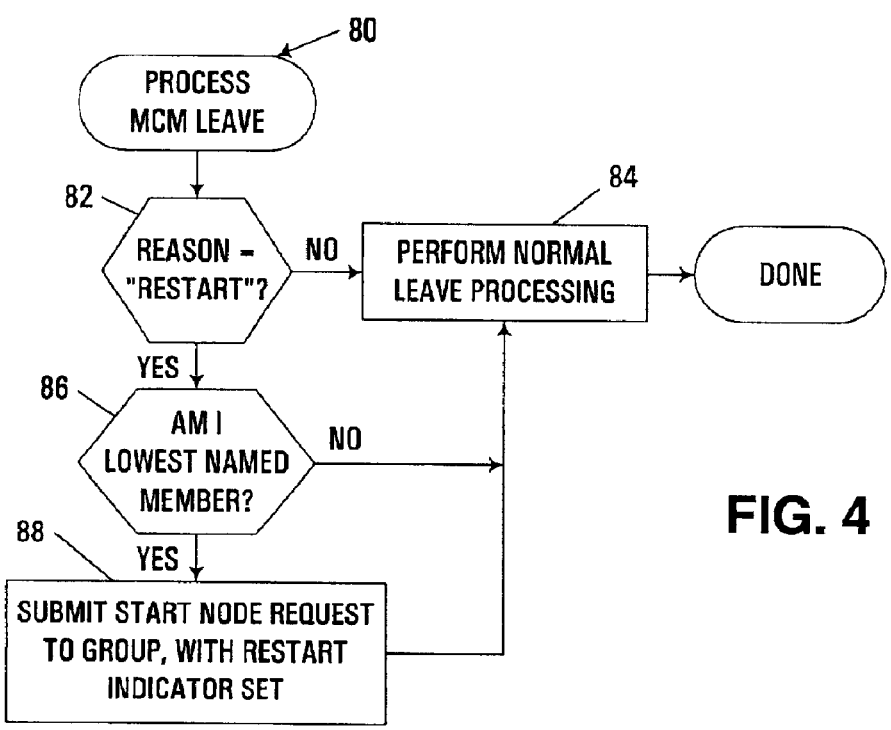
FIG. 4 is a flowchart illustrating the program flow of a process MCM leave message routine performed by a cluster control job on a node in the clustered computer system of FIG. 1.

Now turning to FIGS. 3 and 4, a specific embodiment of the invention, for use in an OS/400 clustering environment utilizing AS/400 or I series servers from International Business Machines Corporation is described. FIG. 3, in particular, illustrates at 50 the program flow associated with handling a clustering failure on a failing node. FIG. 4 illustrates a process Membership Change Message (MCM) leave routine 80 executed by another node in a clustered computer system to initiate a restart operation consistent with the invention.

As will become more apparent below, this embodiment of the invention relies on a membership change protocol to notify other nodes in a cluster of the need to restart a failed node. See, for example U.S. Ser. No. 09/481,177, filed on Jan. 12, 2000 by Funk, Goft, Kloper, Pinter and Yeger-Lotem, which is incorporated by reference herein, for a discussion of membership change protocol and ordered messaging in general. In addition, a start protocol, which operates in the same manner as for adding a new node to a clustering environment, is also used. It will be appreciated, however, that in other clustering environments, e.g., in environments supported by other manufacturers, alternate protocols may be utilized to perform the notification and restart initiation operations described herein. Therefore, the invention is not limited to the OS/400 environment described herein.

In general, an automated restart operation as described in connection with FIGS. 3 and 4 begins with the detection of a clustering failure in a node, which requires that the node unregister with the cluster. The cluster control group member resident on the failing node unregisters with the cluster using a Membership Change Message (MCM) to initiate a membership change protocol on the other nodes of the system. Associated with the MCM is a restart indicator that indicates that the purpose of the membership change is to restart the node. Upon initiation of the membership change protocol, the cluster control job on the failed node ends as in a normal error situation.

Upon receiving the membership change protocol, the remaining members of the cluster control group on the other nodes in the cluster select one member to submit a start node request and initiate a start node protocol on the failed node. In this embodiment, the lowest-named member is selected to submit the start node request, and an indicator associated with the request is used to indicate that the start request is a "restart". The start node protocol creates a new cluster control member on the previously-failed node, and the node completes its join in the same manner as if the node were being newly added to the cluster. If the cluster control member on the previously-failed node tries to unregister during the start protocol, the start message may be checked to determine if the start message indicated a restart. Through checking this condition, the cluster control member can prevent recursive attempts to restart the node.

Turning now to FIG. 3, the principal operations in handling a clustering failure on a failing node are illustrated at 50. This sequence of operations is performed by the clustering control job on the failed node, and may be initiated in response to detection of a clustering failure either by the clustering control job, the clustering resource services, or another job resident on the node. Beginning at block 52, it is determined whether a restart indicator has been set for the node. As will be described in greater detail below, the restart indicator is typically supplied in the initial start message that is sent by another node when attempting to restart a failed node. The restart indicator may be represented using any suitable data structure, and is predominantly used to distinguish the restart operation from a conventional start operation that might be manually initiated by a user on another node.

Assuming first that the restart indicator is not set, control passes to block 54 to unregister the node from the cluster, using a "restart" reason code. Typically, unregistration of the node is performed via an unregister function call 56 to the clustering resource services resident on the failed node.

In the herein-described embodiment, various reason codes are capable of being incorporated into an unregistration call, as well as in a membership change request used to initiate a membership change protocol. To support the automated restart functionality described herein, a dedicated "restart" reason code is used. Any suitable data structure may be utilized to signify a restart condition.

In response to invocation of the unregister function 56 by the cluster control job, the clustering resource services sends a Membership Change Message (MCM) in block 58 with the "restart" reason code (e.g., via setting a reason field in the message to a value associated with a restart) incorporated into the message. Sending of the Membership Change Message notifies the other nodes in the cluster of the need to restart the failed node.

Based upon the ordered messaging utilized in the clustered computer system, clustering resource services will receive a response that indicates that the message was sent and received. A confirmation, designated at 60, is therefore returned to the cluster control job upon completion of the initiation of the membership change protocol. The cluster control job then ends clustering on the node at block 62, typically by invoking an end clustering function 64 to terminate the clustering resource services as shown at block 66. In addition, once termination of the clustering resource services is initiated by the cluster control job, control passes to block 68 to terminate the cluster control job itself. Thus, upon the completion of blocks 66 and 68, all clustering on the node is terminated.

Now turning to FIG. 4, the processing of the Membership Change Message sent to the other nodes in the cluster is illustrated by a process MCM routine 80. A Membership Change Message having a "restart" reason code is considered a type of "leave" membership change request, as it is desired for the node signaling the restart to "leave" the cluster. Routine 80 therefore represents the MCM leave functionality for every node in the cluster, and is typically handled by the cluster control job on that node.

Routine 80 begins in block 82 by determining whether the reason code for the received MCM has a "restart" code. If not, conventional leave processing is performed as shown at block 84, and routine 80 is complete.

However, in the case of a restart reason code, block 82 passes control to block 86 to determine whether the local node is the lowest-named member for the cluster control group. The decision in block 86 essentially assigns one member of the cluster control group to handle the initiation of the restart operation, and thus prevents multiple restart operations from being initiated by multiple nodes in the cluster. Other methods of selecting one member to initiate the restart operation may be used in the alternative. For example, in some embodiments, one member of a cluster control group may be designated the "leader", whereby any non-leader nodes would simply defer processing of the restart request to the leader.

If the cluster control member executing routine 80 is not the lowest-named member, control passes directly to block 84. On the other hand, if the member is the lowest-named member, and is thus assigned the responsibility of initiating the restart operation, control passes to block 88 to submit a start node request to the group, with a restart indicator set in the request. Submission of the request initiates a start node protocol, which may operate in the same manner as any other start node protocol used to start a node and initialize the node for clustering. The only difference being that a restart indicator is set to ensure that the node being started recognizes that the node is being restarted.

Various start protocols may be utilized consistent with the invention. For example, in the aforementioned OS/400 environment, a start protocol may generally operate by using a dedicated TCP/IP port to the inetd daemon to start a cluster-related job on the node. The job started on the node would then spawn a cluster control member, and forward the message data sent to the inetd port to the cluster control member to initiate the registration of the node with the cluster.

It will be appreciated that, due to ordered messaging, the start protocol will not be processed until the MCM protocol is complete. As such, prior to the start protocol being received by the failed node, both the cluster control member and the clustering infrastructure will typically have been terminated on the node.

It will be appreciated that other protocols for starting a node may be used in the alternative. For example, other TCP/IP ports, or a shared file system, may be used to start a job for initiating clustering on a node. Generally, no modification of the start protocol, other than the addition of a restart indicator, would be required to support automated restart functionality as described herein.

Returning now to FIG. 3, prevention of recursive attempts to restart a node is supported through detection of the restart indicator in block 52. As described above, the program flow shown at 50 is called in response to a clustering failure. Block 52 therefore determines whether the clustering failure occurred during a restart attempt on the node, indicating potentially that the node is incapable of being restarted in the manner described herein. If the restart indicator is set, block 52 passes control to block 70 to determine whether a protocol count exceeds a predetermined threshold. The protocol count is a running tally of the number of protocols that is successfully completed by a node since clustering was started on the node. The protocol count value is incremented each time a protocol is processed. The threshold may be empirically determined to ensure that, after a node has been restarted, and has been operating for an adequate period of time, the restart indicator will no longer be capable of preventing the node from being restarted in the future. This accommodates for the fact that a node may be restarted, yet operate long enough to essentially be up and running, whereby a later error may permit another restart operation to occur.

Therefore, if the protocol count is not greater than a predetermined threshold, block 70 passes control to block 72 to signal a failure, indicating that an automated restart operation is not capable of being performed. Otherwise, if the protocol count exceeds the threshold, block 70 may either simply pass control to block 54, or in the alternative, may optionally clear the restart indicator as shown at block 74. Block 74 is optional, given that as long as the protocol count exceeds the threshold, the presence of a set restart indicator will not prevent a restart operation from occurring. Nonetheless, it may be desirable in some embodiments to clear the restart indicator sometime after the node is up and running to permit the node to be restarted at a later time if required.

The signal of a failure in block 72 may result in the initiation of an MCM leave protocol to unregister the node with the cluster. However, in such an instance, a failure reason, rather than a restart reason, would be indicated in the message. A program flow similar to blocks 54–68 would be performed, but with the reason code set to indicate a failure.

Various modifications may be made to the illustrated embodiments without departing from the spirit and scope of the invention. For example, a restart protocol that is separate from the start protocol may be used in some embodiments. However, by utilizing the same protocol for both starts and restarts, system complexity is reduced.

Other modifications will be apparent to one of ordinary skill in the art having the benefit of the instant disclosure. Therefore, the invention lies in the claims hereinafter appended.

What is claimed is:

1. A method of restarting a node in a clustered computer system, wherein the clustered computer system hosts a group including first and second members that reside respectively on first and second nodes, the method comprising:

(a) in response to a clustering failure on the first node, notifying the second member of the group using the first member by issuing a request to the group; and (b) in response to the notification, initiating a restart of the first node using the second member;

wherein the group further includes a third member that resides on a third node in the clustered computer system, and wherein issuing the request to the group includes forwarding the request to each of the second and third members of the group, the method further comprising selecting the second member to initiate the restart of the first node.

2. The method of claim 1, wherein the group comprises a cluster control group that includes a member on each node participating in clustering in the clustered computer system, and wherein the first and second members are each members of the cluster control group.

3. The method of claim 1, wherein notifying the second member comprises issuing a membership change request to the group using the first member.

4. The method of claim 3, wherein issuing the membership change request includes indicating in association with the membership change request that the membership change request is for the purpose of restarting the first node.

5. The method of claim 1, wherein initiating the restart includes issuing a start node request to the group using the second member.

6. The method of claim 5, wherein issuing the start node request includes indicating in association with the start node request that the start node request is for the purpose of restarting the first node.

7. The method of claim 6, further comprising:

(a) detecting the clustering failure in the first node; and (b) determining whether the clustering failure occurred during a restart of the first node;

wherein notifying the second member of the group using the first member is performed in response to detecting the clustering failure in the first node and determining that the clustering failure did not occur during a restart of the first node.

8. The method of claim 7, further comprising signaling an error in response to detecting the clustering failure in the first node if the clustering failure occurred during a restart of the first node.

9. The method of claim 7, wherein determining whether the clustering failure occurred during a restart of the first node includes determining whether the start node request indicates that the start node request is for the purpose of restarting the first node.

10. The method of claim 9, further comprising:
(a) counting protocols processed by the first node after a restart; and
(b) signaling an error in response to detecting the clustering failure in the first node if the clustering failure occurred during a restart of the first node and the number of protocols processed by the first node after the restart is less than a predetermined threshold.

11. The method of claim 5, further comprising, in response to the clustering failure on the first node, terminating clustering on the first node after notifying the second member of the group using the first member.

12. A method of restarting a node in a clustered computer system, wherein the clustered computer system hosts a group including first and second members that reside respectively on first and second nodes, the method comprising:
(a) in response to a clustering failure on the first node, notifying the second member of the group using the first member; and
(b) in response to the notification, initiating a restart of the first node using the second member;
wherein notifying the second member comprises issuing a membership change request to the group using the first member, wherein issuing the membership change request includes indicating in association with the membership change request that the membership change request is for the purpose of restarting the first node; and wherein indicating that the membership change request is for the purpose of restarting the first node includes setting a reason field in the membership change request to a restart value.

13. A method of restarting a node in a clustered computer system, wherein the clustered computer system hosts a group including first and second members that reside respectively on first and second nodes, the method comprising:
(a) in response to a clustering failure on the first node, notifying the second member of the group using the first member;
(b) in response to the notification, initiating a restart of the first node using the second member; and
(c) in response to the notification, selecting the second member from a plurality of members in the group to initiate the restart of the first node;
wherein selecting the second member to initiate the restart of the first node includes determining that the second member is a lowest named member among the plurality of members.

14. A method of restarting a node among a plurality of nodes in a clustered computer system, wherein the clustered computer system hosts a cluster control group including a plurality of cluster control members, each residing respectively on a different node from the plurality of nodes, the method comprising:
(a) detecting a clustering failure on a first node among the plurality of nodes;
(b) in response to detecting the clustering failure on the first node, issuing a membership change request from the first node to the cluster control member on at least second and third nodes among the plurality of nodes, the membership change request indicating that the membership change request is for the purpose of restarting the first node;
(c) terminating clustering on the first node after issuing the membership change request;
(d) in response to the membership change request, selecting the second node to restart the first node from among the at least second and third nodes receiving the membership change request, wherein the at least second and third nodes receiving the membership change request are different from the first node;
(d) after selecting the second node, issuing a start node request using the selected second node, the start node request indicating that the purpose of the start node request is for restarting the first node; and
(e) in response to the start node request, restarting the first node by initiating clustering on the first node.

15. A method of restarting a node among a plurality of nodes in a clustered computer system, wherein the clustered computer system hosts a cluster control group including a plurality of cluster control members, each residing respectively on a different node from the plurality of nodes, the method comprising:
(a) detecting a clustering failure on a firs node among the plurality of nodes;
(b) in response to detecting the clustering failure on the first node, issuing a membership change request from the first node to the cluster control member on each other node in the plurality of nodes, the membership change request indicating that the membership change request is for the purpose of restarting the first node;
(c) terminating clustering on the first node after issuing the membership change request;
(d) in response to the membership change request, selecting a second node from the plurality of nodes that is different from the first node;
(d) issuing a start node request using the selected second node, the start node request indicating that the purpose of the start node request is for restarting the first node;
(e) in response to the start node request, initiating clustering on the first node; and
(f) in response to a second clustering failure during initiation of clustering on the first node:
(i) determining from the start node request that initiated clustering on the first node that the purpose of the start node request is for restarting the first node; and
(ii) in response to determining that the start node request is for restarting the first node, signaling an error instead of initiating a second restart of the first node.

16. An apparatus, comprising:
(a) a memory accessible by a node in a clustered computer system; and
(b) a program resident in the memory, the program configured to initiate a restart of another node in the clustered computer system in response to a notification from the other node of a clustering failure on the other node, wherein the program comprises a member of a group hosted by the clustered computer system, the group including an additional member residing on the other node, wherein the notification comprises a request issued to the group by the additional member, and wherein the program is further configured to determine, in response to the request, that the node upon which the program is resident should initiate the restart of the other node, such that only one node in the clustered computer system initiates the restart of the other node in response to the request.

17. The apparatus of claim 16, wherein the group comprises a cluster control group that includes a member on each node participating in clustering in the clustered computer system.

18. The apparatus of claim 16, wherein the program is configured to initiate the restart by issuing a start node request to the group.

19. The apparatus of claim 18, wherein the start node request indicates that the start node request is for the purpose of restarting the first node.

20. The apparatus of claim 16, wherein the program is configured to initiate the restart of the other node responsive to a membership change request received from the other node.

21. The apparatus of claim 16, wherein the group comprises a cluster control group that includes a member on each node participating in clustering in the clustered computer system; and wherein the program is configured to determine whether the membership change request indicates that the membership change request is for the purpose of restarting the first node.

22. A clustered computer system, comprising:
   (a) first, second, and third nodes coupled to one another over a network; and
   (b) a group including first, second, and third members, the first member resident on the first node, the second member resident on the second node, and the third member resident on the third node, wherein the first member is configured to notify the second and third members in response to a clustering failure on the first node by issuing a request to the group that is forwarded to each of the second and third members of the group, wherein the group is configured to select the second member to initiate a restart of the first node in response to the notification, and wherein the second member is configured to initiate the restart of the first node in response to the notification.

23. The clustered computer system of claim 22, wherein the first member is further configured to terminate clustering on the first node after notifying the second member.

24. The clustered computer system of claim 22, wherein the group comprises a cluster control group that includes a member on each node participating in clustering in the clustered computer system, and wherein the first and second members are each members of the cluster control group.

25. The clustered computer system of claim 22, wherein the first member is configured to notify the second member by issuing a membership change request to the group.

26. A clustered computer system, comprising:
   (a) first and second nodes coupled to one another over a network; and
   (b) a group including first and second members, the first member resident on the first node and the second member resident on the second node, wherein the first member is configured to notify the second member in response to a clustering failure on the first node, and wherein the second member is configured to initiate a restart of the first node in response to the notification; wherein the first member is configured to detect the clustering failure in the first node, determine whether the clustering failure occurred during a restart of the first node, and notify the second member in response to detecting the clustering failure in the first node and determining that the clustering failure did not occur during a restart of the first node.

27. The clustered computer system of claim 26, wherein the first member is further configured to signal an error in response to detecting the clustering failure in the first node if the clustering failure occurred during a restart of the first node.

28. The clustered computer system of claim 26, wherein the second member is configured to initiate the restart by issuing a start node request to the group, and wherein the first member is configured to determine whether the clustering failure occurred during a restart of the first node by determining whether the start node request indicates that the start node request is for the purpose of restarting the first node.

29. The clustered computer system of claim 28, wherein the first member is configured to signal an error in response to detecting the clustering failure in the first node if the clustering failure occurred during a restart of the first node and a tracked number of protocols processed by the first node after the restart is less than a predetermined threshold.

30. The clustered computer system of claim 26, further comprising a third node coupled to the first and second nodes, wherein the group includes a third member resident on the third node, wherein the first member is configured to notify the third member in response to the clustering failure on the first node, and wherein each of the second third members is configured to locally select a single member in the group to initiate the restart of the first node.

31. The clustered computer system of claim 30, wherein the second member is configured to locally select the single member by determining whether the second member is a lowest member among the members of the group.

32. A program product, comprising:
   (a) a program configured to reside on a node in a clustered computer system, the program configured to initiate a restart of another node in the clustered computer system in response to a notification from the other node of a clustering failure on the other node, wherein the program comprises a member of a group hosted by the clustered computer system, the group including an additional member residing on the other node, wherein the notification comprises a request issued to the group by the additional member, and wherein the program is further configured to determine, in response to the request, that the node upon which the program is resident should initiate the restart of the other node, such that only one node in the clustered computer system initiates the restart of the other node in response to the request; and
   (b) a signal storage medium storing the program.

33. A program product, comprising:
   (a) first, second and third programs respectively configured to reside on first, second and third nodes in a clustered computer system, the first, second and third programs respectively operating as first, second and third members of a group, the first program configured to notify the second program and the thrid program in response to a clustering failure on the first node by issuing a request to the group that is forwarded to each of the second and third members, the second program configured to, in response to the request, determine that the second program should initiate a restart of the first node, the second program further configured to initiate the restart of the first node after determining that the second program should initiate the restart, and the third program configured to defer to the second program to initiate the restart of the first node; and
   (b) at least one signal storage medium storing the first and second programs.

34. The program product of claim 33, wherein the first and second programs are stored on separated signal storage medium.

35. The program product of claim 33, wherein the first and second programs are stored on a same signal storage medium.

* * * * *